United States Patent [19]

Camus

[11] Patent Number: 5,109,580
[45] Date of Patent: May 5, 1992

[54] MOUNTING CLAMP FOR HELICOPTER SKID

[76] Inventor: Mark Camus, 9301 SW. 92nd Ave., B104, Miami, Fla. 33176

[21] Appl. No.: 512,270

[22] Filed: Apr. 20, 1990

[51] Int. Cl.$^5$ .................................................. A44B 21/00
[52] U.S. Cl. ........................................ 24/458; 24/486; 24/517; 244/118.1; 269/238
[58] Field of Search ................. 24/568, 502, 503, 505, 24/513, 515, 517, 67.1, 458, 486; 269/238, 268; 294/108, 109, 82.32; 244/118.1

[56] References Cited

U.S. PATENT DOCUMENTS

| 579,912 | 3/1897 | Woolf | 24/517 X |
|---|---|---|---|
| 2,197,128 | 4/1940 | Harrison | 269/238 X |
| 3,109,677 | 11/1963 | Hoover, Sr. | 294/82.23 X |
| 3,950,829 | 4/1976 | Cohen | 24/503 X |
| 4,637,575 | 1/1987 | Yenzer | 244/118.1 X |
| 4,836,389 | 6/1989 | Poulton | 24/67.1 X |

FOREIGN PATENT DOCUMENTS 604233  8/1960  Canada ............................ 24/67.1

Primary Examiner—James R. Brittain
Attorney, Agent, or Firm—Malloy, Downey & Malloy

[57] ABSTRACT

A clamp assembly primarily designed for the removable attachment of a load supporting device to a skid or like support structure of a helicopter such that additional load or cargo may be mounted exteriorally of the helicopter body and generally between the supporting skid assembly and the cockpit or other interior cargo space. The clamp assembly is removably secured to the load supporting structure and includes two clamp body segments pivotal relative to one another between an open position and a clamped position, the latter being defined by a gripping or clamping of the clamp segment about the generally tubular structure defining the skid assembly.

16 Claims, 3 Drawing Sheets

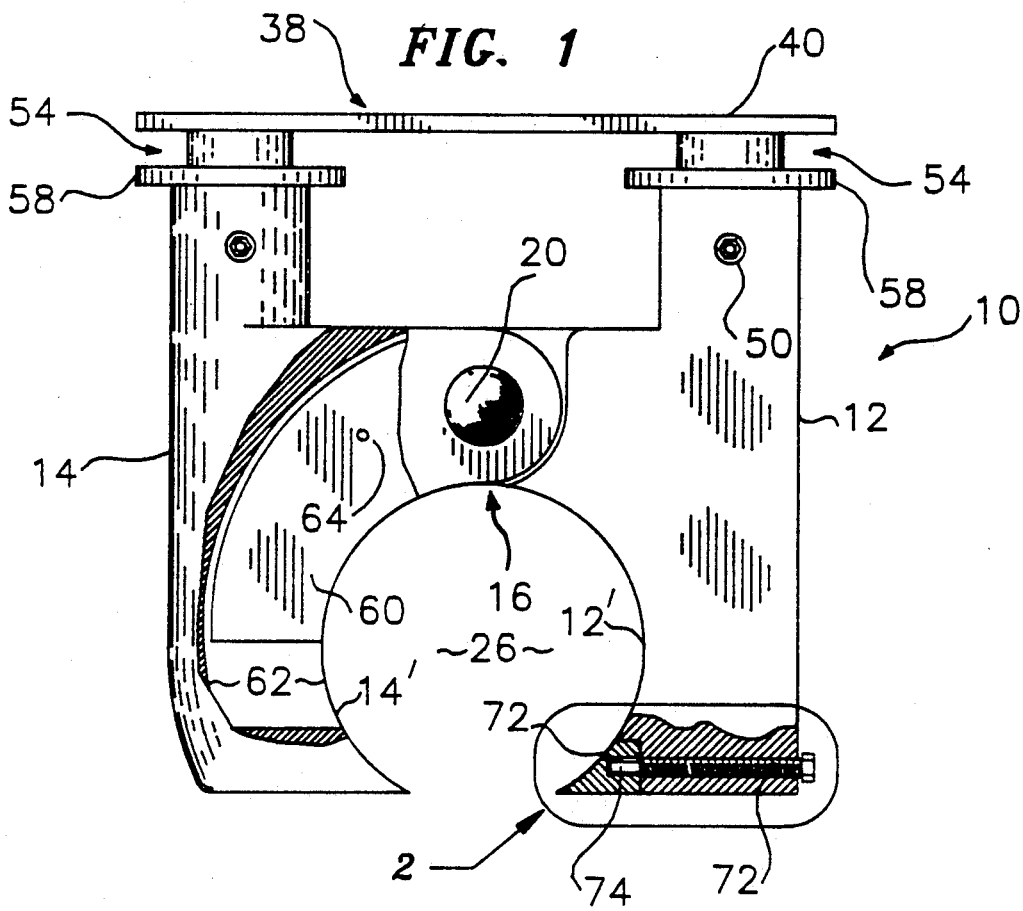

MOUNTING CLAMP FOR HELICOPTER SKID

BACKGROUND OF THE INVENTION

1. Field of the Invention

This invention relates to a clamp assembly designed to removably secure a load supporting deck or like device to a supporting skid assembly of a helicopter or like vehicle such that the load supporting structure is safely attached to the skid assembly but can easily be removed therefrom when desired.

2. Description of the Prior Art

Helicopters frequently include a landing or support structure in the form of two elongated skids generally having a tubular configuration and extending downwardly from the cockpit or interior cargo area of the helicopter and generally along the majority of the length thereof. While it is recognized that the interior space within the helicopter is generally limited, it is also equally true that additional unused or wasted space exists on the exterior of the cockpit between the supporting skid assembly and bottom of the helicopter body. Normally, it is recognized that the majority of helicopters have sufficient power to carry additional weight or cargo. However, the limitations on the interior space within the helicopter, in turn, limits the amount of cargo carried by the helicopter. This is particularly true when such cargo may include relatively bulky items which cannot easily positioned on the interior of the helicopter or through the doors associated therewith.

Accordingly, attempts have been made in the prior patented art to secure some type of load supporting device to the skid assembly of the helicopter in a manner which will not interfere the normal operation of the skid assembly during landing and takeoff of the helicopter. Such a support structure should allow for the securement of additional loads or cargo on the exterior of the helicopter generally in supported relation on the skid assembly.

The following U.S. patents are generally representative of prior art structures related to the attachment of some type of load supporting structure to exterior portions, and primarily to the skid assembly, of a helicopter-type vehicle. Genzer, U.S. Pat. No. 4,637,575, discloses a helicopter work platform primarily designed for working on power lines and having a rectangular base of electrically conductive material disposed transversely across a pair of helicopter skid tubes such that the skid tubes may be laterally displaceable upon landing or takeoff with respect to the position of the work platform. Attachment of the platform is provided primarily by U-shaped connectors surrounding, at least in part, the skid tubes associated with the skid assembly.

Shwayder, U.S. Pat. No. 4,544,166, discloses a helicopter landing skid shoe pad wherein the pads are effectively clamped on to the skid tubes by means of a semicircular or generally U-shaped bracket attached by a U-shaped connector having its outer ends locked into place by a plurality of internally threaded nut-type connectors. Chavis, U.S. Pat. No. 3,904,155, discloses a helicopter step and cargo carrier assembly comprising a tubular frame adapted to be connected directly to the skid tube supports and providing an elongated horizontal surface of substantial length. Fixed U-shaped brackets are disposed in surrounding fixed engagement with the skid tubes or other tubular portions of the under carriage of the helicopter and there is no removable clamping feature other disassembly and removal of the U-shaped connectors.

Dean, et al., U.S. Pat. No. 4,609,167, discloses a helicopter cargo rack which is connectable to the helicopter, and/or positionable in an operative position relative thereto at least in part by spring bias latches or the like.

Other related structures are disclosed in the U.S. patents to Kurtgis, U.S. Pat. No. 4,478,312; Ott, U.S. Pat. No. 4,553,719; and Coffy, U.S. Pat. No. 4,645,143, each disclosing some type of attachment device secured to the skid assembly or supporting under carriage of the helicopter, and further wherein, each of the auxiliary devices have some type of particularly adapted and designed attachment relating specifically to the article or load carrying structure being attached.

Regardless of the various structures present in the prior art as generally represented by the above-noted patents, there is still a need for an efficient and effective clamping assembly which facilitates attachment and removal of a load supporting structure to the skid assembly and general under carriage of a helicopter in a manner which is reliable and also further facilitates the attachment and removal of such a load bearing structure as desired.

SUMMARY OF THE INVENTION

The present invention is directed towards a clamp assembly particularly to be adapted to be removably secured to a tubular skid member of a skid assembly used to support a helicopter or like vehicle as a support under portion. The clamp assembly includes a clamp body having a first and second segment pivotally attached to one another by an innerconnected hinge means. The first and second segments are disposed in spaced apart relation to one another, when a clamped position so as to define a receiving space therebetween. The receiving space is dimensioned and configured to allow positioning therein of one of the tube members of the skid assembly. When the tube member so positioned, the segments effectively surround the majority of the exterior surface of the tubular skid member in clamping engagement therewith.

A keeper assembly includes a keeper member formed of a substantial and flexible, high-strength material having mounted thereon two outwardly extending substantially parallel prongs or leg members. These prongs extend outwardly in a substantially common direction from what generally be considered an under surface of the keeper member. Further, each of the segments include one elongated channel extending into a hollow interior portion of each of the segments. Each of the channels are dimensioned and configured to receive what may be considered at least an outer portion or free end of the prongs of the keeper member therein. When the prongs are positioned within the respective channels of the respective segments, the keeper member is adapted to be disposed on an outer surface of a load supporting structure such as a sheet, panel or like device wherein the segments disposed on the opposite surface of the load supporting structure and the two prongs pass through appropriately disposed and configured apertures formed in the load supporting structure. By virtue of this connection, the load supporting structure is effectively clamped between what may be considered an under surface of the keeper member and an exposed free end of each of the segments.

The aforementioned clamped position, therefore, may be defined by the prongs passing through the load supporting structure in the interior of the respective channels of the respective segment and the two segments effectively clamped about a tubular skid member of the skid assembly which is received within the receiving space as defined above.

A locking means is provided in the form of a plurality of elongated pins or like structures passing transversely through each of the segments and also through the two prongs disposed on the interior of the channels of the various segments. Threaded connectors such as nuts or the like are attached to the outer protruding ends of each of the locking pins so as to maintain the pins in interconnecting, locking engagement with the various segments and the prongs disposed thereof. The locking means further comprises at least one additional pin extending through one of the segments and also through a lock insert position therein. More specifically, one of the first and second segments has a lock insert connected thereto and positionable within the interior of the other segment. Relative pivotal movement of the two segments causes the locking insert to move relative to and on the interior of the other segment. When the two segments are in the clamped position, the locking insert is positioned entirely along its length within the interior of the other segment and an additional locking pin which is also a part of the locking means passes transversely through the other segment and through the locking insert disposed on the interior thereof. By virtue of the above set forth connection, the two segments are prevented from pivotal movement relative to one another due to the fixed positioning of the locking insert due to engagement with one of the locking pins as well as the two prongs of the keeper assembly passing into the interior of the locking channel and contained therein by the plurality of locking pins also defining part of the locking means.

Another important feature of the present invention is the incorporation of an adjustment means which is secured to one of the segments and substantially adjacent a periphery of the receiving space. The adjustment means may be selectively positionable into the interior of the receiving space and into abutting engagement with an exterior surface of the tubular skid member disposed within the locking space. The stop member is movable into the aforementioned abutting engagement so as to adapt the clamping assembly to any variances in transverse dimension or configuration of the tubular skid member received within the receiving space. This stop member ensures a fixed clamping engagement of the clamp body, as set forth above, with the received tubular skid member.

BRIEF DESCRIPTION OF THE DRAWINGS

For a fuller understanding of the nature of the present invention, reference should be had to the following detailed description taken in connection with the accompanying drawings in which:

FIG. 1 is a front view in partial cutaway and section of the clamp assembly in its clamped position.

FIG. 2 is a detailed view in partial cutaway and section of one component of the subject clamp assembly.

FIG. 3 is a bottom view of the embodiment of FIG. 1.

Like reference numerals refer to like parts throughout the several views of the drawings.

DETAILED DESCRIPTION OF THE PREFERRED EMBODIMENT

Figure 4:
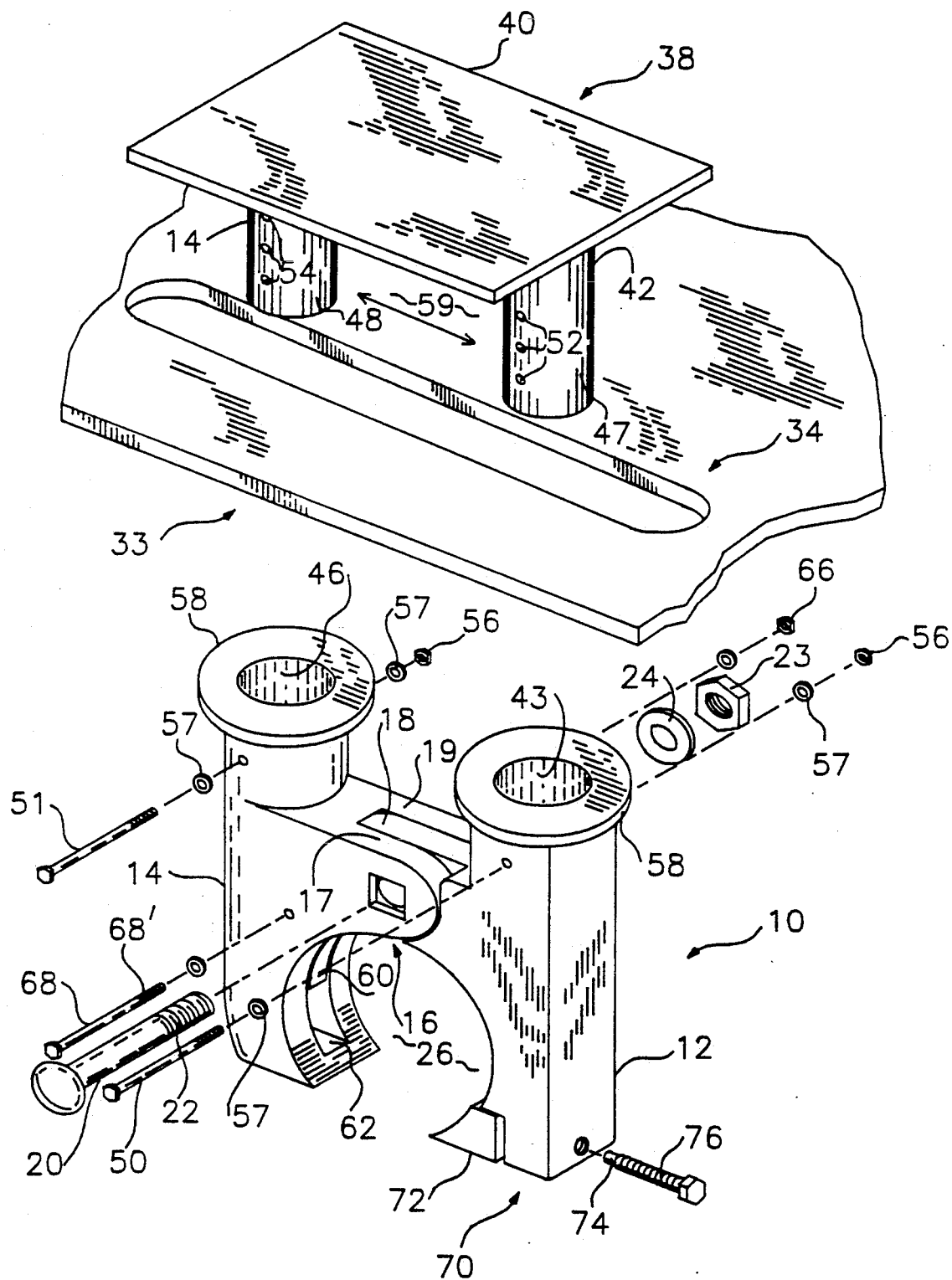
FIG. 4 is an exploded view of the various components of the clamp assembly and a load supporting structure to be clamped thereto.
Figure 4A:
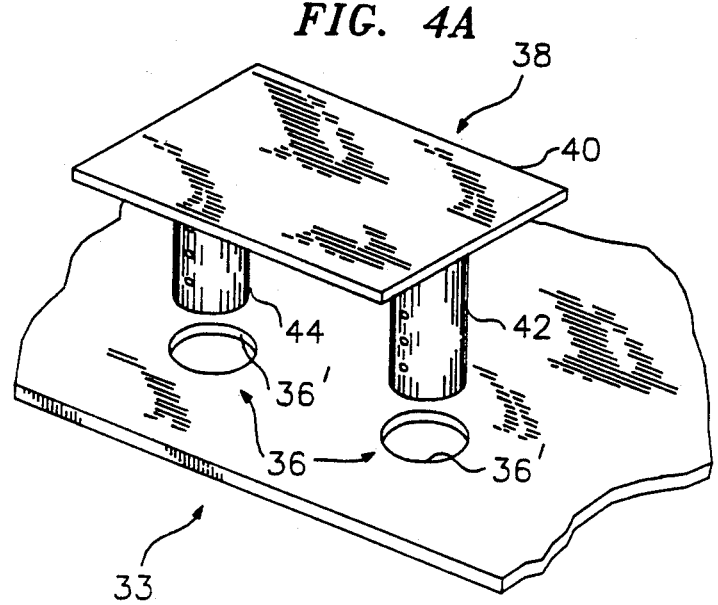
FIG. 4A is a perspective view in partial cutaway and exploded form of a different embodiment of the present invention.
Figure 5:
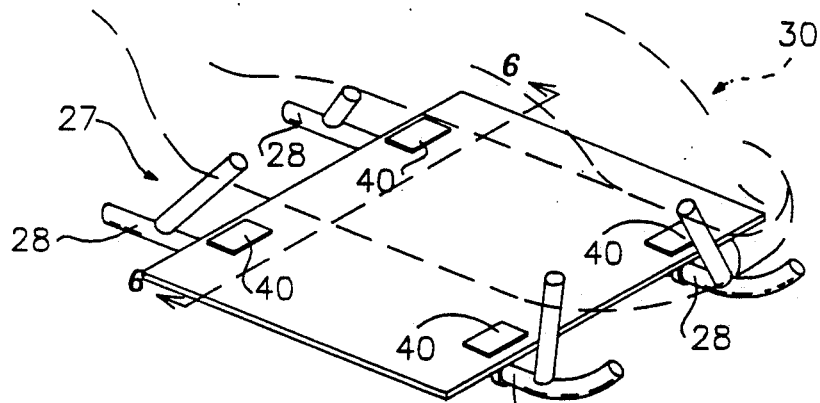
FIG. 5 is a perspective view in partial phantom of a load supporting structure mounted on a skid assembly incorporating the clamp assembly of the present invention.

As shown in FIGS. 1-6, the present invention is directed towards a clamp assembly generally indicated as 10. The clamp assembly includes a clamp body defined by a first clamp segment 12 and a second clamp segment 14. The two clamp segments 12 and 14 are pivotally attached to one another by a hinge means generally indicated as 16 such that the two segments 12 and 14 may be selectively pivotal into and out of a clamped position relative to one another. Generally, the clamp assembly 10 is shown in its clamped position in FIGS. 1, 3, and 6. The hinge assembly 16 includes inner locking flanges 17 and 19 fixedly secured to the second segment 14 and a flange 18 fixedly secured to the first segment 12. Such flanges 17, 18, and 19 are interconnected by a pivot pin in the form of an elongated connector such as a bolt 20 extending therethrough and defining a pivot pin. The outermost end of the bolt 20 is externally threaded as at 22 so as to receive nut and washer members 23 and 24. The nut may be a self-locking type nut so as to insure maintenance of the locking pin or bolt 20 in the intended position as shown in FIGS. 1 and 3.

When in the clamped position, the two segments 12 and 14 are disposed in spaced apart relation to one another so as to define a receiving space 26 therebetween. The receiving space is applicably dimensioned and configured into a substantially congruent configuration relative to the tubular members 28 of a skid assembly generally indicated as 27 affixed to the under surface of a helicopter represented in phantom lines in FIG. 5 as 30. The clamped or closed position of the clamp assembly 10 is such that the two segments 12 and 14 must be first moved to what may be referred to as an open position and pivotal relative to one another such that the interior surfaces within the space 26 as 12' and 14' substantially surround and effectively engage the outer surfaces of the tubular skid member 28 as perhaps best shown in FIG. 6.

As pictured in FIGS. 4, 4A, 5, and 6, the purpose of the clamp assembly is to removably mount in a secure, reliable fashion a load supporting structure generally indicated as 33 on the under carriage and more specifically on the skid assembly 27 associated with the helicopter 30. In the embodiment shown, the load supporting structure 33 is in the form of a panel, sheet or like member having an aperture means generally indicated as 34 and 36 (see FIGS. 4 and 4A), such that a keeper assembly generally indicated as 38 will pass through the load supporting structure 33 into engagement with the clamp body including each of the clamp segments 12 and 14. More specifically, the keeper assembly 38 includes a keeper member 40, having fixedly secured thereto, two outwardly extending, elongated prongs 42 and 44 structured to pass through the respective aperture means 34 and 36 of the load supporting structure 33 and into interior portions of the first and second segments 12 and 14, respectively. More specifically, each of the segments 12 and 14 include an elongated interiorally disposed channel 45 and 46 disposed, dimensioned and configured to receive the outer or free end portions at 47 and 48 of each of the prongs 42 and 44. The prongs 42 and 44 pass into the interior of the channels 45 and 46 after passing through the aperture means 34 or 36 of the load supporting structure 33. Once positioned therein, a locking means in the form of one or more locking pins 50 and 51 pass transversely through the two segments 12 and 14 as well as elongated channels 45 and 46 and also transversely through the prongs 42 and 44 positioned therein. This is accomplished by the provision of receiving slides or apertures 52 formed in spaced relation to one another along the length of each of the prongs 42 and 44. It should be apparent that the distance generally indicated a 54 (see FIG. 1) may vary to accommodate different thicknesses of the load supporting structure 33 dependent on which apertures each of the locking pins 50 and 51 pass through. Threaded external connectors as at 56 may be secured to an outer projecting, externally threaded end of the locking pins 50 and 52 as shown in both FIGS. 3 and 4. Washers 57 may also be provided. In order to ensure fixed clamping engagements of the keeper member 40 and the two clamp body segments 12 and 14 with opposite surfaces of the load supporting structure 33, outwardly extending annular flanges as at 58 are mounted substantially adjacent to the entrance of the two channels 45 and 46. These flanges are sufficiently enlarged so as to accomplish a firm clamping action of the opposite surfaces of the load supporting structure 33 between the clamped segments 12 and 14 and the keeper member 40.

Figure 6:
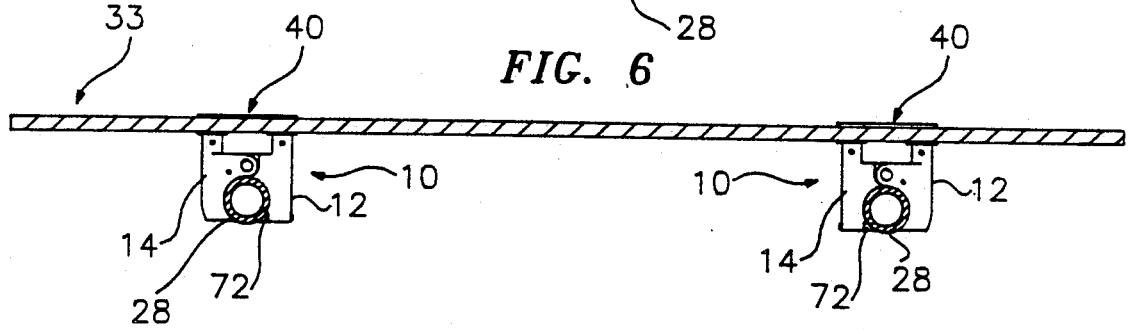
FIG. 6 is a transverse sectional view of a load structure as pictured in FIG. 5 along line 6—6 thereof.

Further, the difference in shapes of the aperture means 34 and 36 (see FIGS. 4 and 4A) formed in the load supporting structure 33 is provided to accommodate a certain amount of "give" or movement when the skid assembly 27 expands upon landing and takeoff of the helicopter from the ground or other supporting surface. More specifically, the space between the tubular skid members 28 will vary depending upon and whether the helicopter 30 rests on the ground or is in flight. As the helicopter 30 comes to rest, the space between the tubular skid members 28 will expand. As the helicopter takes off and is airborne, the space between the two tubular skid members 28 will diminish since there is no weight applied thereto. Accordingly, the elongated aperture means 34 is integrally formed in the load supporting structure 33 and has a greater length than the space distance between the prongs 42 and 44. The keeper assembly 38 and accordingly the entire clamp assembly 10 will therefore be able to be displaced at least to some extent in accordance with the directional arrow 59 to accommodate for the landing and takeoff of the helicopter and the movement of the tubular skid members 28 relative to one another during such functions. To the contrary, the embodiment of FIG. 4A comprises two spaced apart apertures 36' each disposed to receive one of the prongs 42 and 44 therein. Therefore, the keeper assembly 38 is immovable at least transversely relative to the load supporting structure 33 once it is locked in its clamped position as shown in FIG. 6.

Another feature of the present invention generally associated with locking and maintaining the assembly 10 in its clamped position (see FIG. 1), is the existence of a locking insert 60 affixed to the first segment 12 but movably positionable within the interior 62 of the second segment 14. The locking insert 60 is movable with the first segment 12 and accordingly is pivotally inserted to the interior 62 of the second segment 14 when the clamp assembly assumes its clamped position. The locking means includes an additional locking pin 68 having an elongated configuration and disposed to pass through a portion of the second segment 14 and transversely through the locking insert 60 through existing apertures 64 therein. A threaded nut or like threaded connector 66 will be connected to the outwardly protruding externally threaded end 68' of the additional locking pin 68 as indicated in FIG. 3. This structure aids in the maintenance of the two segments 12 and 14 relative to one another when in the clamped position.

Yet another feature of the present invention is represented in FIGS. 1, 2 and 4 and comprises an adjustment means generally indicated as 70. The adjustment means 70 includes a stop member 72 mounted substantially adjacent to the periphery 26' of the receiving space 26 and is positionable into the receiving space 26 into abutting engagement with the tubular skid member 28. Selective positioning of the stop member 72 occurs by its being rotatably mounted on an interior end 74 of an elongated externally threaded connector 76 passing through the first segment 12 as best pictured in FIGS. 1, 2 and 4. An elongated receiving channel is internally threaded to matingly engage and cause longitudinal movement of the elongated externally threaded connector 76 as it is rotated about its own longitudinal axis. Such rotation will cause the abutting member 72 to move into or out of the receiving space 76 and into engagement with the exterior surface of the tubular member 78 (also see FIG. 6). By virtue of this component, the space 26 may be effectively adjusted to accommodate skid tubes 28 of varying sizes. A snug clamping engagement is thereby accomplished with the segments 12 and 14 relative to the skid tube member 28 positioned within the receiving space 26 when the assembly 10 is in the clamped position.

Now that the invention has been described,

1. A clamping assembly for mounting a load supporting structure to a skid assembly of a helicopter, said clamp assembly comprising:
    a. a clamp body having a first segment and a second segment movably connected to one another and positionable between a clamped position and an open position,
    b. said clamped position defined by first and second segments disposed in spaced relation to one another to define a receiving space therebetween dimensioned and configured to receive a portion of the skid assembly therein in engaging relation to said first and second segments,
    c. a keeper assembly including two elongated prongs fixedly connected in spaced relation to one another by a keeper member and each prong removably connected to a different one of said first and second segments when in said clamped position,
    d. said keeper assembly adapted to removably secure the load supporting structure to said clamp body and the skid when in said clamped position, and
    e. locking means mounted on said clamp body and disposed and structured for locking said clamp body in said clamped position, said locking means being removably received in interconnecting, locking engagement with each of said first and second segments and respective ones of said prongs connected thereto.

2. An assembly as in claim 1 wherein said keeper assembly comprises said prongs mounted in outwardly extending relation to said keeper member in a substantially common direction, an outer portion of each of said prongs removably attached to a different one of said first and second segments.

3. An assembly as in claim 2 wherein each of said first and second segments include hollow interior portions dimensioned and disposed when in said clamped position to receive a different one of said outer portions of said prongs therein.

4. An assembly as in claim 3 wherein each of said first and second segments include an elongated channel formed therein and disposed and configured when said clamp body is in said clamped position to receive said outer portions of said prongs therein.

5. An assembly as in claim 4 wherein locking means comprises at least two elongated locking pins each disposed in transverse relation through said channels and in interconnecting engagement with one of said first and second segments and a respective one of said prongs therein.

6. An assembly as in claim 5 wherein each of said locking pins includes a locking connector secured to one protruding end thereof extending outwardly from said first and second segments.

7. An assembly as in claim 3 wherein said locking means is structured to engage each of said prongs at one of a plurality of spaced apart locations along the length thereof, each of said locations on said prongs engaging said locking means being structured to define a different spaced distance of said keeper member from said clamp body.

8. An assembly as in claim 7 wherein said keeper assembly is structurally adapted when connected to said clamp body in said clamped position for disposition of said keeper member and said clamp body on opposite sides of said load supporting structure in clamping engagement therewith.

9. An assembly as in claim 1 further comprising hinge means mounted on and pivotally connecting each of said first and second segments to one another, said first and second segments pivotal relative to one another between said clamped position and said open position.

10. An assembly as in claim 9 wherein said hinge means further comprises a pivot pin removably secured thereto in attaching engagement with both said first and second segments, said first and second segments removably secured to one another by said pivot pin and detachable from one another upon removal of said pivot pin from said hinge means.

11. An assembly as in claim 9 wherein said keeper assembly comprises said prongs mounted in outwardly extending relation to said keeper member in a substantially common direction, an outer portion of each of said prongs removably attached to a different one of said first and second segments.

12. An assembly as in claim 11 wherein each of said first and second segments includes a hollow interior portion dimensioned and disposed when in said clamped position to receive a different one of said outer portions of said keeper assembly therein.

13. An assembly as in claim 12 wherein each of said first and second segments includes an elongated channel formed therein and disposed and configured when said clamped body is in said clamped position to receive said outer portions of said prongs therein.

14. An assembly as in claim 9 wherein one of said first and second segments includes a locking insert fixedly secured thereto and movable therewith relative to the other of said first and second segments, said locking insert disposable on the interior of said other segment when said clamp body is in said clamped position.

15. An assembly as in claim 14 wherein said locking means comprises a locking pin having an elongated configuration and passing transversely through both said other segment and said locking insert in removable, locking engagement therewith, said locking insert being substantially fixed within said other segment when interconnected thereto by said locking pin.

16. An assembly as in claim 1 further comprising an adjustment means mounted on one of said first and second segments adjacent said receiving space and movably relative to said one segment selectively into and out of said receiving space and into engaging relation with the skid structure disposed therein when said clamp body is in said clamped position.

* * * * *